Aug. 5, 1958
A. O. ROSS
2,846,377
MOLD CAVITIES AND FORCE PLUGS
Filed Oct. 28, 1952
5 Sheets-Sheet 1
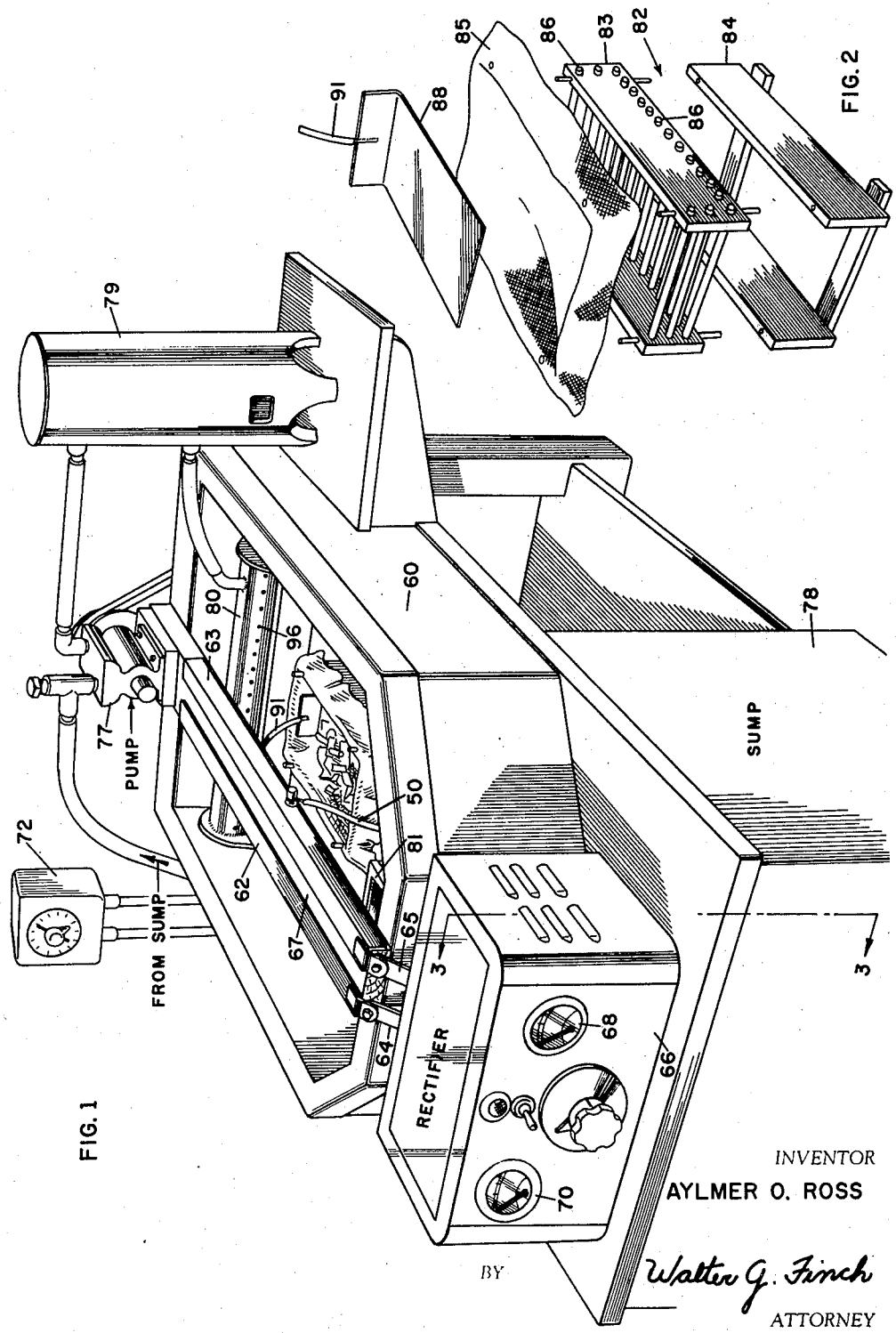
INVENTOR
AYLMER O. ROSS
BY *Walter G. Finch*
ATTORNEY INVENTOR
AYLMER O. ROSS
BY Walter G. Finch
ATTORNEY Aug. 5, 1958  A. O. ROSS  2,846,377
MOLD CAVITIES AND FORCE PLUGS
Filed Oct. 28, 1952  5 Sheets-Sheet 3
FIG. 5
(MODEL TO BE COPIED)
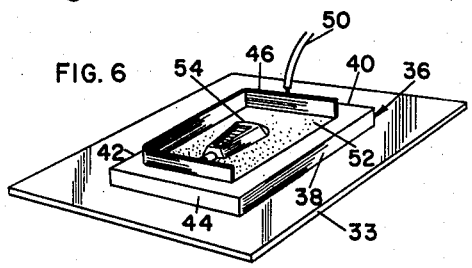
FIG. 6
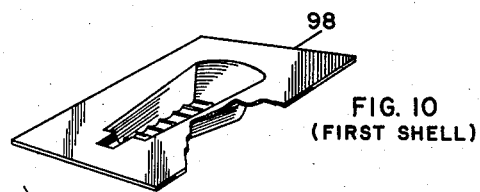
FIG. 10
(FIRST SHELL)
FIG. 11
(WAX SPRAY ON 1ST SHELL)
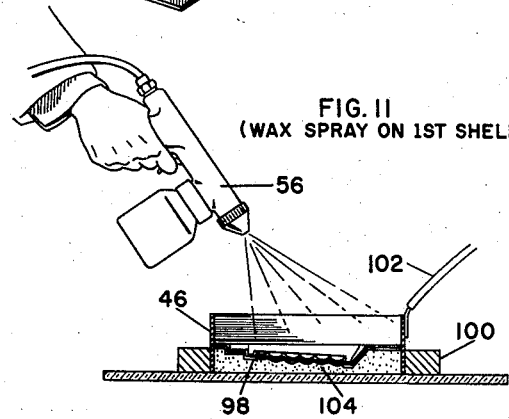
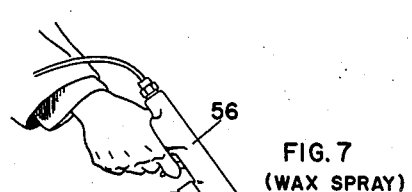
FIG. 7
(WAX SPRAY)
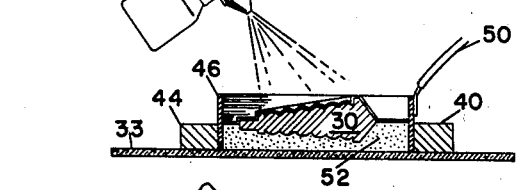
FIG. 8
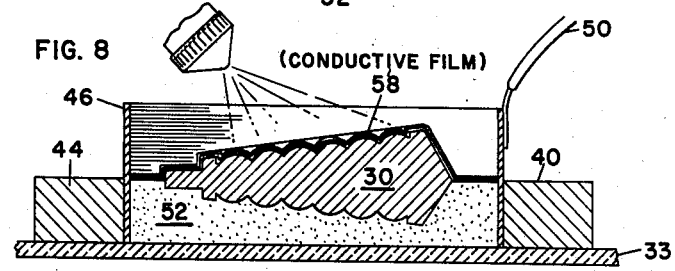
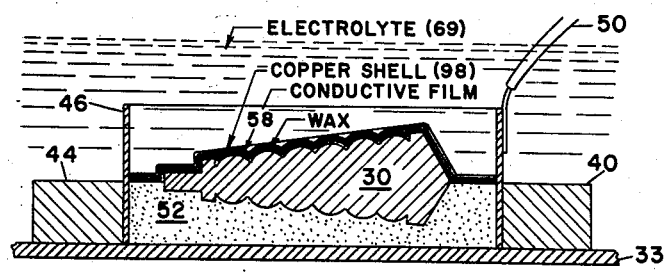
FIG. 9
(ELECTROFORMING 1ST SHELL-98)
INVENTOR
AYLMER O. ROSS
BY Walter G. Finch
ATTORNEY

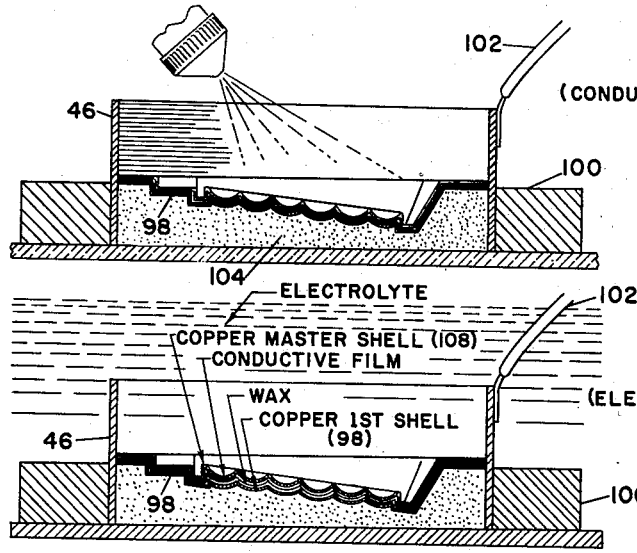
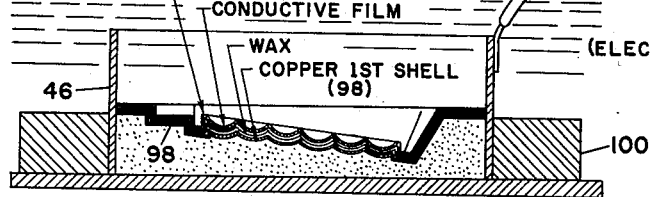
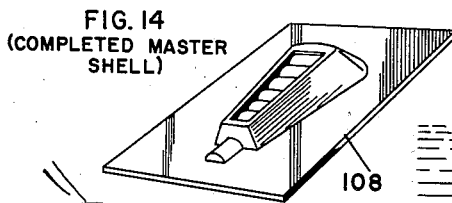
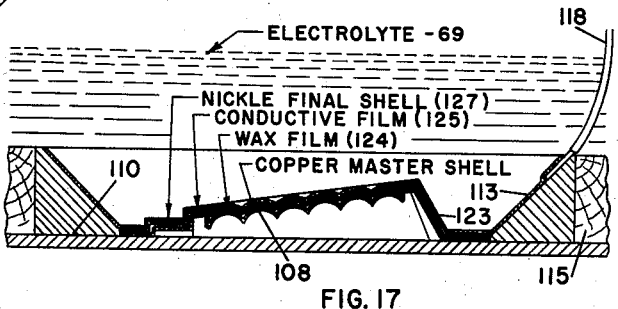
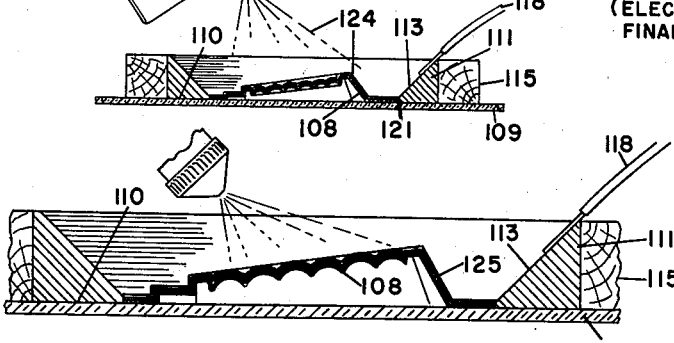

Aug. 5, 1958  A. O. ROSS  2,846,377
MOLD CAVITIES AND FORCE PLUGS
Filed Oct. 28, 1952  5 Sheets-Sheet 5

(COMPLETE DIE HALF)

INVENTOR
AYLMER O. ROSS

BY Walter G. Finch
ATTORNEY

United States Patent Office 2,846,377
Patented Aug. 5, 1958

2,846,377

MOLD CAVITIES AND FORCE PLUGS

Aylmer O. Ross, York, Pa., assignor, by mesne assignments, to Jackson K. Lytle, Baltimore, Md.

Application October 28, 1952, Serial No. 317,228

3 Claims. (Cl. 204—6)

This invention relates generally to a process for producing molds and dies. More particularly the invention relates to a process for forming mold cavities, force plugs, molds and dies, for use in manufacturing shaped molded articles and stampings, by the electrodeposition of metals.

The manufacture and production of multi-piece metal dies and molds, of intricate design and detail, by conventional methods, in addition to being expensive, tedious, and time consuming, is also difficult to accomplish due to the fact that each die or mold section must be carved or hobbed out by one having a high degree of manual skill, or formed by means of various engraving and machining processes. When a die or mold section or piece is carved or hobbed out by hand, it is practically impossible to obtain identical dies or molds. In addition, multi-fold machining and engraving operations for molds are expensive, and such operations are difficult to reproduce.

It is, therefore, one of the objects of this invention to provide a novel process for the manufacture and production of metal dies and molds which can ge utilized for forming and shaping plastic, rubber, and like articles and stampings.

Still another object of this invention is to provide a process for producing metal molds and dies of any desired number of complementary sections by the electrodeposition of metals.

Even another object of this invention is to provide a novel process for forming multi-piece molds and dies from an intricate design pattern in which the detail and design formed on the finished mold or die is of the highest order.

Still another object of this invention is to provide a novel process for manufacturing metal molds or dies in which the electrodeposited metal shell is securely and integrally mounted and bonded in a suitable steel casting to give the finished mold or die high strength and rigidity.

And even another object of this invention is to provide a process for manufacturing metal molds and dies which is inexpensive, simple, efficient, and which is easy to carry out and reproduce.

Other objects and many of the attendant advantages of this invention will be readily appreciated as the same becomes better understood by reference to the following detailed description when considered in connection with the accompanying drawings, wherein:

Fig. 1 is a perspective view of electrolytic apparatus for carrying out the process of the invention;

Fig. 2 is an exploded perspective view of a basket for holding scrap metal which is to be electrodeposited on a pattern;

Fig. 5 is a perspective view of a pattern which is to be used for the electroforming of a mold or die thereof;

Fig. 6 is a perspective view of the pattern mounted on glass within a framework, with wax filler being applied to the section line thereof;

Fig. 7 is a cross section through the mounting of Fig. 6 illustrating the application of a thin layer of wax to the pattern and framework by spraying;

Fig. 8 is an enlarged view of Fig. 7 illustrating the application of a conductive material to the waxed surfaces by spraying;

Fig. 9 is a cross section through the arrangement of Fig. 8 illustrating the first electrodeposition of metal upon the pattern to form a first male mold shell;

Fig. 10 is a perspective view of the first male mold shell removed from the pattern and framework of Fig. 6;

Fig. 11 is a cross section of the first male mold mounted on glass within a framework with wax filler applied, illustrating the application of wax to the mold shell surface;

Fig. 12 is an enlarged view similar to Fig. 11 illustrating the application of conductive material to waxed surface of first male mold shell and framework;

Fig. 13 illustrates the arrangement of Fig. 12 in the electrolytic apparatus of Fig. 3, showing the second electrodeposition of metal upon the first male mold for forming a master or second mold shell;

Fig. 14 is a perspective view of the master or second mold shell removed from the framework and from the first male mold shell;

Fig. 15 is a cross section of the master or second mold shell mounted within a steel casting on glass with wax filler applied and a film of wax being applied to the mold surface;

Fig. 16 is an enlarged view of the arrangement in Fig. 15, illustrating the application of a conductive coating to the master or second mold shell;

Fig. 17 is a cross section of the arrangement in Fig. 16 illustrating the forming of a third master mold shell from the second mold shell by electrodeposition of a suitable metal;

Figure 3:
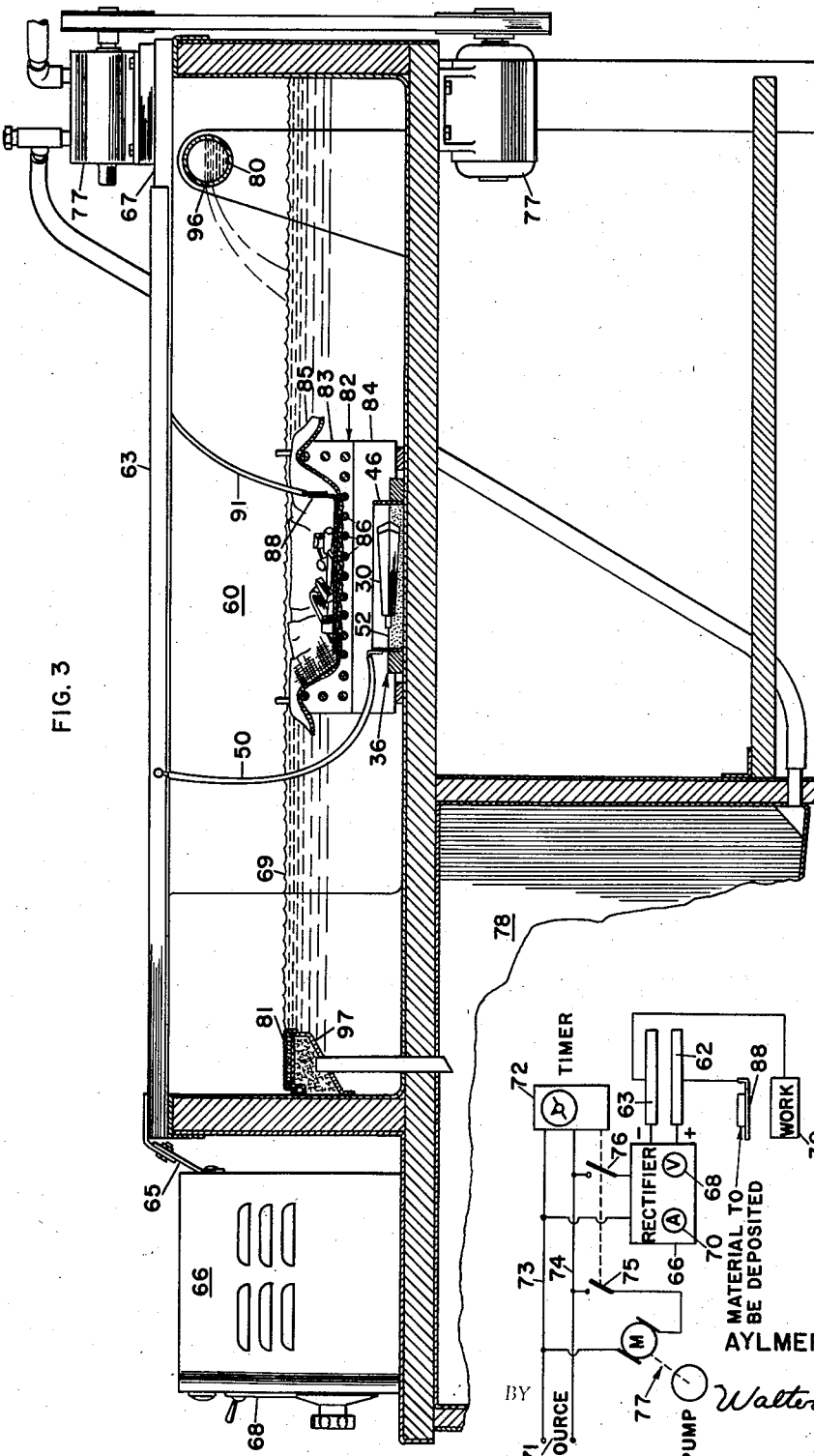
Fig. 3 is a cross-section along plane 3—3 of the electrolytic apparatus shown in Fig. 1, showing a pattern, framework, and basket in position for the electrodeposition of metal thereon.

In accordance with the invention, a novel process is provided for electroforming of multi-piece metal molds, dies, mold cavities, force plugs, or the like. This process comprises embedding a wooden pattern or the like in wax except for that portion of the pattern which forms the outline of the mold piece then being formed. The unwaxed surface of the pattern is then thinly coated with liquid wax, and the waxed surfaces in turn are coated with a thin conductive film. A first shell or layer of suitable metal is then electroformed on the conductive surfaces of the pattern, and this layer of metal is then removed from the pattern.

The first layer of metal is again mounted in a framework and the pattern face thereof is treated with wax and conductive metal as previously described. A second layer or shell of suitable metal is then electrodeposited on the pattern face of the first layer or shell of metal. The first and second shells of metal are then separated.

The second shell or layer of metal is then mounted in a suitable steel casting, and its pattern face is treated with wax and conductive material, and then a third shell or layer of suitable metal is electrodeposited thereon as well as on the steel casting, and is bonded to the latter. The back of the third shell or layer of metal is then filled with metal to reinforce and strengthen the shell and to form one section of the finished die or mold. This process is then repeated to form other sections of a mold or die.

In carrying out the process of this invention for forming molds, mold cavities, force plugs, or dies by the electro-deposition of metals, a suitable pattern 30, such as an umbrella hand, having the configuration and design intended for duplication in the molded articles or stampings is provided as shown in Fig. 5. This pattern can be formed of any suitable material, such as wood, plastic, and the like, and it is the exact shape desired for the castings from the finished molds. The pattern 30 may be of such a shape that a two-piece metal mold or a multi-piece metal mold or die may be required in order to duplicate the pattern. For simplicity, the process to be described hereinafter is limited to the formation of a two-piece metal mold or die which can be utilized for stamping or forming ashtrays or other simple objects. It is to be emphasized, however, that the electrolytic process about to be described can be used for forming molds and dies of any number of desired pieces or sections.

In carrying out the process, pattern 30 is placed on a base 33 comprising a smooth, flat surface, such as glass or tin, as illustrated in Fig. 6. A framework 36 is then placed around the pattern 30. This framework is capable of holding liquid wax, and it is usually formed of four wooden members 38, 40, 42 and 44, although not necessarily limited thereto, disposed to form a rectangular enclosure. The four members 38, 40, 42 and 44 are the four walls of the enclosures. However, it is to be noted that framework 36 can comprise any base of suitable material having a smooth surface on which are fastened retaining walls of a suitable material forming an enclosure of any desired shape and, therefore, is not limited to the arrangement illustrated in Fig. 6.

A continuous metal strip 46, such as a copper strip, is now attached to the framework 36 about three sides thereof, such as 40, 42 and 44. An electrical terminal 50 is firmly attached to the copper strip 46, as illustrated in Fig. 6.

In forming a two-piece metal mold of pattern 30, melted wax 52, such as paraffin or beeswax, is then poured into the framework 36 so as to cover the pattern 30 except for that portion, say surface 54 of pattern 30, which is to be used for forming the first section of the metal mold or die. The wax is then allowed to set.

The exposed pattern surface 54, the wax surface 52, and the exposed retaining walls of the framework 36 are then sprayed with liquid wax by means of a spray gun 56 to give the surfaces an even, light coating, as illustrated in Fig. 7. This liquid wax comprises a solution of any wax, for example, Russian wax in high-test naphtha. As an example of a wax solution, eight (8) ounces of chipped wax can be mixed with one (1) quart of naphtha. This mixture is agitated, and then allowed to stand overnight. The mixture is then strained through a muslin cloth. The wax solution should be the color of strong tea, that is, amber. The wax mixture is preferably applied as a spray by means of spray gun 56 and not by means of a brush. The lighter, more uniform the film, the better will be the detail that can be obtained from the pattern 30, and thus the better will be the detail of the finished mold or die. This film of wax is then air-dried to evaporate the solvent from the wax.

The next step in the process is to apply to the dried wax surfaces 52 and 54, as shown in Fig. 8, a conductive material 58 comprising one of the following:

(a) Graphite dust, such as electrotyper's graphite, which can be applied with a camel's hair brush or by means of a spray gun 56;

(b) Fine bronze powder which is applied in the same manner as in (a); or (c) A silver nitrate solution.

When either (a) or (b) is used, it is necessary to apply the film of wax as previously described. However, when (c) is followed, it is not necessary to apply the thin film of wax. Using silver nitrate is the preferred method since a uniform coating can be obtained on the pattern surface 54. It is essential, however, when using either (a), (b) or (c) above, that a uniform coating must be obtained. The purpose of each of (a) (b) or (c) is to give the surface 54 of pattern 30 a metallic coating so that when the pattern is subsequently immersed in the electrolytic bath it will be an efficient electrode or conductor.

After the surface 54 of pattern 30 is sprayed with a conductive material, surface 54 is then rinsed with water. This will prevent contamination of the other chemicals in the electrolytic bath with the silver nitrate. For (a) and (b) above, the pattern and entire framework should be submerged completely in water and withdrawn. This should be done three successive times in order to wash off all loose powder of bronze or graphite. For (c), it is only necessary to dip the framework 36 once in water.

Figure 4:
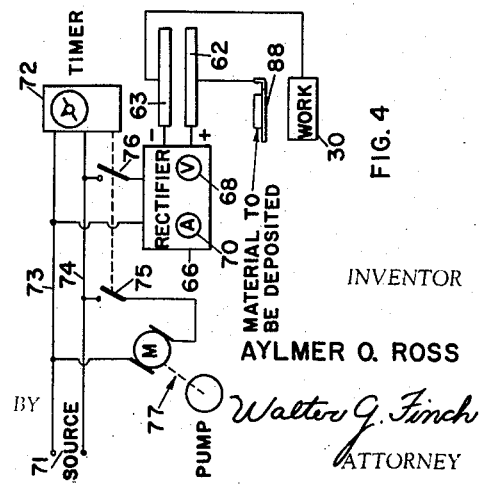
Fig. 4 is a schematic of the circuitry for the electrolytic apparatus illustrated in Figs. 1 and 3.

The framework 36, containing pattern 30, is now placed at the bottom of a large, specially designed electrolytic tank or tray 60, best seen in Figs. 1 and 3, in which the electrolytic deposition of the metal is to take place. This electrolytic apparatus is described more fully in a companion application of the applicant filed October 28, 1952, Serial No. 317,229, now Patent 2,771,415. This tray is mounted on a suitable platform. Tray 60 comprises metal sidewalls and bottom for holding a suitable electrolyte 69. This tray 60 has extending above it two bus bars 62 and 63 connected to the positive and negative terminals 64 and 65 of a rectifier unit 66 having a source of alternating current 71, shown in Fig. 4. The bus bars 62 and 63 are supported by and spaced apart by a wooden member 67, which extends above the tray 60. Rectifier unit 66 has provided therein a voltmeter 68 and an ammeter 70, for measuring voltage and current, respectively. Rectifier 66 is connected to an alternating current source of power 71 and a timing mechanism 72 by leads 73 and 74. A mechanical switching arrangement 75 and 76, controlled by the timing mechanism 72, is utilized for turning the current on for the rectifier 66 and motor-pump arrangement 77.

Electrolyte 69, as shown in Figs. 1 and 3, is pumped into tray 60 by means of the suitable motor-pump arrangement 77 from a sump 78 located below the tray. This electrolyte is heated to the desired temperature by heater 79 prior to being introduced into the tray 60 through the manifold nozzle arrangement 80. Excess electrolyte is drained through an overflow filter or strainer arrangement 81 into sump 78.

A wooden basket 82, shown in Fig. 2, of special design serves to hold the anode. This basket 82 is specially prepared. The wood from which the basket 82 is made is first cooked in wax to preserve it and make it acid-resistant. The wood is first cooked for approximately one-half an hour in paraffin at 180 degrees F., until it stops "gasing." The two sections 83 and 84 of the basket are then fastened together by using wooden dowel pins, such as 86, which pass through holes bored for this purpose. The basket 82 is so formed that there is no metal in its construction.

In the bottom of the basket 82 there is first placed a muslin cloth 85 which is held in place by dowel pins 86. This muslin cloth is used for straining impurities. A strip of metal 88, such as copper, which is the anode, is then placed in basket 82. Finely divided pieces of the same metal, copper, are then placed on the anode strip 88 in the basket. Metal pieces in the form of shots are preferred. This fine division of the metal scrap can be obtained by mechanical means, or by melting the metal and pouring it through a screen into water. The reason for utilizing scrap metal in finely divided form is that in electrolysis the anode is attacked only at and on its surfaces. Therefore, the greater the surface area of the anode that is exposed to the electrolyte, the more efficient is the electrolysis. Thus, the more finely divided the metal is, the greater will be the surface area.

The basket 82, either before or after the preparation therein of the anode 88, is placed in the electrolytic tray 60 directly above the framework 36 holding the pattern 30. The anode strip 88 is then electrically connected to the positive bus bar 62 by lead 91. Since the finely divided metal pieces have been placed on the anode strip, there is good electrical contact between the positive bus bar and the entire anode. The terminal wire 50 from the pattern framework 36 is then attached to the terminal of the negative bus bar 63.

It is to be emphasized that although the anode is here illustrated as copper and the metal to be electrodeposited is copper, any other suitable metal can be used for carrying out the process to be described for electroforming molds or dies and that this invention is not to be limited to this metal.

The tray 60 is now filled with electrolyte 69 sufficient to cover the framework 36, pattern 30, and the scrap metal in the basket 82. If the metal in the basket 82 is copper, as indicated above, the electrolyte utilized would be copper sulphate.

The electrolyte 69 is pumped into the tray 60 through the manifold arrangement 80, which has a plurality of orifices 96, with each orifice 96 being about 3/32" in diameter. The electrolyte 69 enters the tray 60 in this way continuously throughout the electrolytic process. Any surplus electrolyte 69 escapes through the overflow filter or strainer arrangement 81 at one end of the tray. The electrolyte 69 which has thus escaped is filtered and again pumped into the tray 60 by motor-pump arrangement 77. The basket 82 is so constructed as to offer the least possible obstruction to the flow of electrolyte 69. The cloth 85 in the basket 82 acts as a filter. When the electrolyte 69 is copper sulphate, cotton 97 can be used as the filter or strainer for the excess electrolyte. It is important to keep the electrolyte 69 in constant circulation. The motor-driven pump 77 preferably has a capacity of 10 gallons per minute for this purpose.

An electric current from A. C. source 71 is now passed through the copper sulphate electrolyte 69 from the copper anode 88 in the basket 82 to the pattern 30 mounted in the framework 36. The current density should not exceed 75 amperes per square foot of the exposed surface of the pattern 30. At the outset of the process of electrodeposition, the voltage must not exceed one and one-half (1½) volts. The voltmeter 68 in the rectifier unit 66 is used for regulating the voltage at this level until a uniform deposit of copper has appeared on the pattern surface 54. This step of the process will require from one (1) to one and one-half (1½) hours. The timing mechanism 72 is utilized for controlling all periods of electrodeposition of metal.

The voltage is next raised to two and one-half (2½) volts and the electrolysis continued for about five (5) hours at this voltage, if that much time is required to deposit the desired thickness. If the desired thickness has not been obtained at the end of this time, the process may be continued thereafter at three and one-half (3½) volts.

After the desired thickness of copper has been deposited, as indicated by 98 in Fig. 9, the electric current is shut off by the timing mechanism 72 (electrolytic circuit is broken), the pump-motor arrangement 77 is also shut off, and the electrolyte 69 is drained from the tray 60. The basket 82 is then removed from the tray and placed in water in order to prevent damage to the cloth. Before the basket 82 is used again, the smudge should be washed from it.

The first copper mold layer or shell 98 and the pattern 30 are now removed from the framework 36, and the shell 98 is separated from the pattern 30. The first copper mold shell 98 will appear as illustrated in Fig. 10.

The film of liquid wax applied to the surface 54 of pattern 30 greatly facilitates this separation.

If a two-piece mold is being made, the whole process so far is repeated, except that the pattern 30 is turned over and so mounted that the portion of it which was embedded in wax the first time is now exposed; and the portion or surface 54 that was exposed the first time is now embedded in wax. In this way, the second or female copper mold shell is made.

The copper mold shell or layer 98 is now mounted in a new framework 100, as illustrated in Fig. 11, like the framework 36 used in Fig. 6. A wire connection 102 is soldered to the back of the mold shell 98 or to the copper strip 46. The back 104 of framework 100 is filled with wax.

The exposed portion or surface 106 of the copper mold 98, and the surrounding wax surface and framework 100, are sprayed with liquid wax by one of the spray guns 56, as shown in Fig. 11. After the liquid wax film is applied, and has dried, then graphite dust or bronze powder is applied as set forth in methods (a) and (b), or silver nitrate can be used as previously indicated for (c). This is illustrated in Fig. 12.

The framework 100 and mold shell 98 are again placed in the electrolytic tank or tray 60, as shown in Fig. 13, and the processes previously described for the first metal mold shell 98 are repeated. The purpose is to make a master metal copper mold shell 108, shown in Figs. 13, 14 and 15. If the mold is to be two-piece mold, this copper master pattern is the third piece to be made in this process. It is the second piece if a one-piece mold is the objective.

The master metal copper mold shell or layer 108 is removed from the framework, and it will appear as illustrated in Fig. 14.

The master copper metal shell 108, shown in Fig. 14, is now trimmed to size and is mounted on a smooth, hard surface, such as glass 109. A steel casting 111 (framework) is then placed about the shell 108. This steel casting will give great strength and rigidity to the finished mold. The front surface 110 of the steel casting 111 has been previously machined to a smooth surface. Both the steel casting 111 and the master shell 108 are placed face down on the glass surface 109, as indicated in Fig. 15. Surface 113 of steel casting 111 has been previously plated with a thin film of nickel by a flash nickel plating operation. A wooden framework 115, shown in Fig. 15, is placed about the steel casting 111, and a terminal connection is made as before as indicated by 118. Graphite or bronze is used to seal the gaps 121 between the shell 108 and the steel casting 111.

The surface 123 of shell 108 is sprayed with liquid wax film 124, and after this film 124 has dried, a conductive material 125, as indicated in (a), (b) or (c) is applied, as shown in Figs. 15 and 16. The edges and outer portions of the framework 115 are dipped in wax to prevent the deposition of metal except on the surface 123 of shell 108 and surfaces 113 of the steel casting 111.

The framework 115, together with steel casting 111 and shell 108, is now placed in the bottom of tray 60, as previously described. This time, however, the metal to be electrodeposited is nickel. The basket 82, this time containing a nickel anode, prepared as previously described, is placed immediately over the copper master mold 108 in the framework 115, as indicated in Fig. 17.

Figure 18:
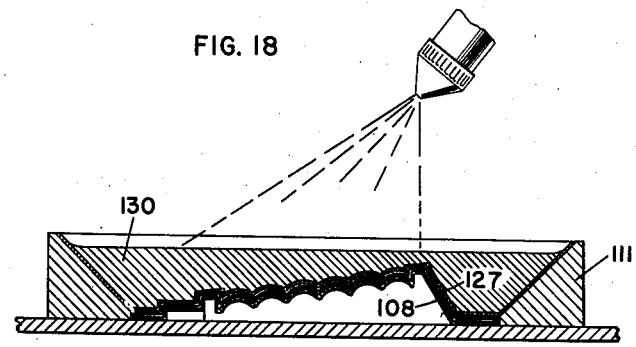
Fig. 18 is a cross section of the arrangement of Fig. 17 illustrating the spraying of metal filler into the third master mold shell and steel casting.

Electrolyte is now introduced into the tray 60. For depositing nickel, the electrolyte preferred is a solution of nickel fluoborate. This is easier to control than most other electrolytes and is much faster. There are many other solutions that can be used; but with any and all of them, continuous agitation is essential for satisfactory results. Current density, time and voltage requirements and all other conditions are the same as previously described. The nickel shell 127 formed over the copper master mold shell 108 should be built up to a thickness of .045". This deposit of nickel bonds the steel casting 111 and the nickel shell 127 deposited on shell 108 into a single strong, tough mold. After the required amount of nickel is deposited, as shown in Fig. 17, framework 115, together with shells 108 and 127 and casting 111, are removed from the tray 60. The wooden framework 115 is removed, and the mold will appear as shown in Fig. 18.

Figure 19:
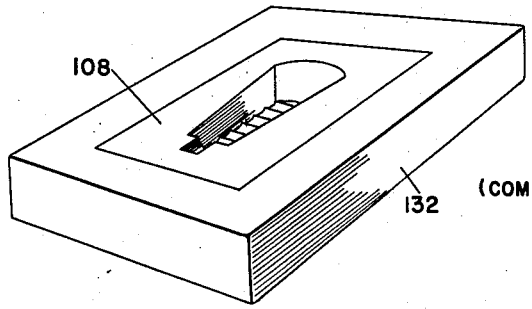
Fig. 19 is a perspective view of a finished mold of one-half of a pattern.
Figure 20:
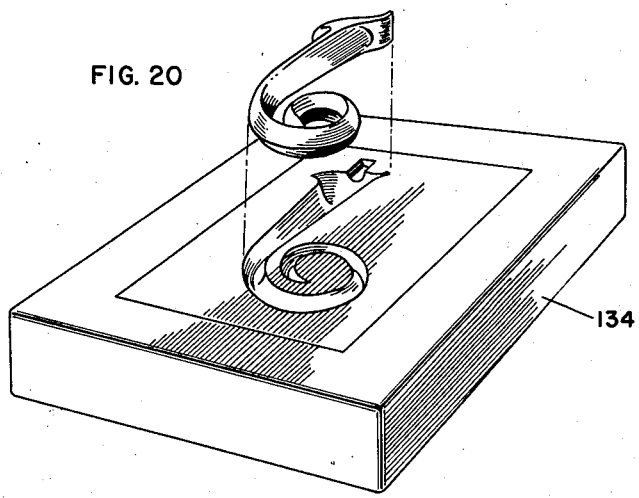
Fig. 20 is a perspective view of a second finished mold.

The cavity 130 in the back of the mold shell 127 is now filled with sprayed (as shown by the gun spray) or poured molten metal and this molten metal is then allowed to harden. Shell 108 acts as a support and also as a cooling plate during this operation of filling cavity 130. This is shown in Fig. 18. After cavity 130 has been filled with metal, the shell 108 is removed and the surfaces are machined, cleaned by dipping in acid, scrubbed, and then nickel plated. The finished mold or die will appear as indicated by 132 in Fig. 19, or as 134 in Fig. 20, which illustrates a slightly different finished mold or die of an umbrella handle. Shell 108 is kept in engagement with shell 127 during the spraying or pouring operation in order to lend support to the metal above it.

Obviously many modifications and variations of the present invention are possible in the light of the above teachings. It is therefore to be understood that within the scope of the appended claims the invention may be practiced otherwise than as specifically described.

What is claimed is:

1. A process for electroforming a metal mold for casting from a pattern of the size and shape desired for the castings, comprising, electrodepositing a first shell of copper on the face of said pattern which is to be reproduced, removing said pattern from said copper shell, electrodepositing a second copper shell upon the pattern face of the first copper shell, removing the second copper shell from said first copper shell, placing said copper shell in a substantially rectangular shaped and open-ended metal casting, then electrodepositing a shell of nickel upon the pattern face of said second copper shell and said metal casting to rigidly connect said nickel shell to said metal casting, removing said second copper shell from said nickel shell, and then filling in the rear surface of said nickel shell and casting to strengthen and reinforce said nickel shell within said metal casting, whereby the completed mold is formed.

2. A process for electroforming a metal mold for casting from a pattern of the exact shape and size which the castings are to duplicate, comprising, electrodepositing a first shell of metal on the face of said pattern, removing said pattern from said first metal shell, electrodepositing a second metal shell upon the pattern face of said first metal shell, removing the two metal shells from each other, placing a substantially rectangular shaped casting having an opening therein around said second shell, coating the face of said second shell with a non-conducting material, then electrodepositing a third metal shell upon the pattern face of said second shell and said metal casting to rigidly connect said third shell to said metal casting, and then filling in the rear surface of said third shell with backing metal to strengthen and reinforce said third shell and casting, whereby the completed mold is formed.

3. A process for electroforming a metal mold for casting from a pattern of the size and shape desired for said castings, comprising, coating the surface of said pattern with a waxy material, applying an electrically conductive film to the waxy surface of said pattern, electrodepositing a first shell of metal on said conductive film surface, separating said pattern from said first shell of metal, coating the pattern face of said first shell of metal with a waxy material, applying an electrically conductive film to the waxy surface of said first shell of metal, electrodepositing a second shell of metal on said conductive film of said first metal shell, separating said first and second metal shells from each other, mounting said second metal shell in a substantially rectangular and open-ended metal casting, coating the pattern face of said second metal shell with a waxy material, applying an electrically conductive film to the waxy material on the pattern face of said second metal shell, electrodepositing a third shell of metal of desired thickness on the conductive surface of said second shell of metal and said metal casting, reinforcing and strengthening the back of said third metal shell, and then separating said second and third metal shells.

References Cited in the file of this patent

UNITED STATES PATENTS

| | | |
|---|---|---|
| 218,473 | Barrie | Aug. 12, 1879 |
| 783,176 | Cheney | Feb. 21, 1905 |
| 1,483,621 | Voigt | Feb. 12, 1924 |
| 1,794,627 | Laukel | Mar. 3, 1931 |
| 1,845,502 | Laukel | Feb. 16, 1932 |
| 1,930,826 | Scott et al. | Oct. 17, 1933 |
| 2,182,775 | Abouchar | Dec. 12, 1939 |
| 2,289,524 | Smith et al. | July 14, 1942 |
| 2,327,762 | Bull | Aug. 24, 1943 |
| 2,349,920 | Welcome | May 30, 1944 |
| 2,540,212 | Paget | Feb. 6, 1951 |

OTHER REFERENCES

Electrometallurgy, Supplement to the Metal Industry, August 14, 1936, pages 165–168; Sept. 4, 1936, pages 239–242; Sept. 11, 1936, pages 265 and 266.